United States Patent [19]

Eder et al.

[11] Patent Number: 4,457,495

[45] Date of Patent: Jul. 3, 1984

[54] APPARATUS FOR THE AUTOMATIC RECOVERY OF SILVER FROM ARGENTIFEROUS WASH WATERS

[75] Inventors: Wilhelm Eder, Leverkusen; Hans Hofman; Joachim Kloeppel, both of Cologne; Heinz Meckl; Josef Busch, both of Bergisch Gladba, all of Fed. Rep. of Germany

[73] Assignee: Agfa-Gevaert Aktiengesellschaft, Leverkusen, Fed. Rep. of Germany

[21] Appl. No.: 299,870

[22] Filed: Sep. 8, 1981

[30] Foreign Application Priority Data

Sep. 11, 1980 [DE] Fed. Rep. of Germany ....... 3034102

[51] Int. Cl.$^3$ ............................................. C22B 11/04
[52] U.S. Cl. ..................................... 266/170; 423/24; 75/118 R; 210/688
[58] Field of Search ............... 210/660, 670, 676, 190, 210/191, 269, 688; 75/118 R; 423/24, DIG. 14; 266/170, 168

[56] References Cited

U.S. PATENT DOCUMENTS

| | | | |
|---|---|---|---|
| 2,365,221 | 12/1944 | Shafor | 210/660 |
| 2,666,741 | 1/1954 | McMullen | 210/670 |
| 3,163,597 | 12/1964 | Thrun | 210/670 |
| 3,369,801 | 2/1968 | Hartman | 266/170 |
| 4,043,907 | 8/1977 | Shimamura et al. | 210/670 |
| 4,137,290 | 1/1979 | Degenkolb et al. | 423/24 |
| 4,159,930 | 6/1979 | Degenkolb et al. | 423/42 |
| 4,186,007 | 1/1980 | Meckl et al. | 430/464 |

FOREIGN PATENT DOCUMENTS 1452618 11/1973 United Kingdom .

*Primary Examiner*—John Doll
*Assistant Examiner*—Robert L. Stoll
*Attorney, Agent, or Firm*—Connolly and Hutz

[57] ABSTRACT

The invention relates to an apparatus for the automatic recovery of silver from argentiferous wash waters comprising an ion exchanger device, a regenerative device and a purification device for the ion exchanger device and a silver separator whereby the devices, the containers thereof, switch elements, pumps and connection lines are arranged in the apparatus such that the three following flow cycles are produced, which may be controlled and periodically switched by a computer.

I. a flow cycle for separating the silver,
II. a flow cycle for regenerating the ion exchanger column, and
III. a flow cycle for purifying the ion exchange column.

4 Claims, 2 Drawing Figures

APPARATUS FOR THE AUTOMATIC RECOVERY OF SILVER FROM ARGENTIFEROUS WASH WATERS

This invention relates to an apparatus for the automatic recovery of silver from argentiferous wash waters, whereby the apparatus comprises an ion exchanger device, a regenerative device and a purification device for the ion exchange device and a silver separator.

Included among the best known industrial argentiferous waste waters are silver solutions produced from the industrial silvering operation of objects having metal surfaces and from fixing solutions and bleach fixing solutions in the processing of photographic materials. The silver must be removed and recovered as completely as possible from these and other argentiferous waste waters due to the high price and toxic effect thereof, and also for legally prescribed reasons.

A number of processes are known for the recovery of silver from fixing baths and from bleach fixing baths which may have a relatively high silver content of up to 10 g/l.

Sodium sulphide may be added to a fixing bath which is heavily charged with silver in order to precipitate the silver as silver sulphide. This process has considerable disadvantages, in particular environmental pollution, since the water is mixed with large quantities of alkali sulphide and a strong odour results.

A process for the recovery of silver from fixing baths is known from German Offenlegungsschrift No. 2,741,080, in which the silver is first recovered from the baths electrolytically and then using ion exchangers. However, the fixing bath solution is not recovered in this process and it flows into a discharge outlet.

A similar process is known from British Patent No. 1,452,618, in which to remove the silver from solutions of a silver bearing complex, the solution is brought into contact with a strongly basic ion exchanger resin and the ion exchanger resin is desorbed in counterflow to the exchanger resin using a neutral salt solution, and the silver is then obtained electrolytically from the solution. The fixing bath solution is regenerated and is reused. This process is too expensive and unsuitable for desilvering wash waters which only contain relatively small quantities of silver, from approximately 5 to 150 mg/l.

This invention is therefore based on the object of providing an apparatus of the type mentioned in the introduction, using which, with a compact construction, it is easily possible to reduce the quantity of silver contained in wash water from photographic developing processes to a value of less than 1 mg/l and to pay off within a short time the cost of such an apparatus with the quantity of silver thereby obtained.

This object is achieved according to the invention with an apparatus of the design mentioned at the beginning in which the devices, the containers thereof, switch elements, pumps and connection lines are arranged in the apparatus such that three flow cycles are produced which may be controlled and switched periodically by a switch element, whereby (I) A first flow cycle for separating the silver from the argentiferous wash water comprises a water reservoir, a pump and an ion exchanger column, and wherein the argentiferous wash water may be introduced into the ion exchanger column from below by the pump from a collecting tank, and after the silver has been deposited in the ion exchanger column, the wash water may be transported to a discharge outlet from the ion exchanger column via an overflow, (II) A second flow cycle for regenerating the ion exchanger column comprises a regeneration agent container, a first pump, the ion exchanger container, iron wool shells, a collection tank for the desilvered regeneration agent and a second pump, and wherein the regeneration agent may be guided from the regeneration agent container through the ion exchanger from above by the first pump in counterflow to wash water, for desilvering the ion exchanger, and the argentiferous regeneration agent may be guided through the iron wool shells for the desilvering operation and may be collected in a collecting tank after leaving the iron wool shells and may be returned to the regeneration agent container by the second pump, and (III) A third flow cycle for purifying the ion exchanger column comprises an acid container, mixing pumps and the ion exchanger column, and wherein the acid from the acid container is dilutable with the wash water using the mixing pumps and may be supplied from below to the ion exchanger column and may be flushed out into the discharge outlet using the wash water after the ion exchanger column has been purified.

The apparatus according to the invention with the three flow cycles provides a surprisingly simple and cheap way of recovering silver and, with the recovery of the silver, meets the legal requirements with respect to the purity of the waste water. As a result of the regeneration of the resin which takes place at certain time intervals in the ion exchanger column and the purification of the ion exchanger column using a dilute acid which takes place at longer time intervals and which may be effected during a weekend, it is possible to achieve an almost continuous recovery of the silver from the wash water of one or more developing machines.

The resin in the ion exchanger column may be used for a very long time and the regeneration solution is returned in the second programme.

The concentration losses are replaced by additions of salt. All three programmes are controlled and monitored in a completely automatic fashion by a switch element so that the apparatus may be operated continuously, almost without staff intervention.

In order to allow the regeneration of the resin in the ion exchanger column in counterflow, an apparatus has been found which is distinguished by the fact that the ion exchanger column is provided in the base part with a plurality of hemispherical heads on a sieve for deaeration during regenerating, which heads are provided with narrow slits, and air removal tubes or pipes which are located on the upper region of the heads and are brought together and connected to an air removal line which is guided over the ion exchanger column.

The regeneration liquid entering from above into the ion exchanger column presses the air in the column downwards so that the air forms an air cushion. The air may be easily removed upwards through the hemispherical heads provided with narrow slits and positioned in the base, so that the regeneration liquid may flow all around the resin and may absorb the silver.

An advantageous embodiment of the ion exchanger column is distinguished by the fact that the column is provided at the top with a sieve and a coarse-grained granulated material which is specifically lighter than the wash water is introduced below the sieve.

As a result of this, the sieve at the top is prevented from becoming congested with the resin and the relatively expensive resin is prevented from being carried out to the discharge outlet.

On the other hand, the granulated material floating below the filter allows the wash water or the regeneration agent to pass through easily.

In a specific embodiment, an electrolysis device for separating the silver from the regeneration agent may be provided in the flow cycle for regenerating the ion exchanger column instead of the iron wool shells.

This is an advantage if electrical energy may be obtained cheaply and if a frequent change of the iron wool shells is to be avoided.

An embodiment of the apparatus is described in more detail below, with reference to drawings wherein.

Figure 1:
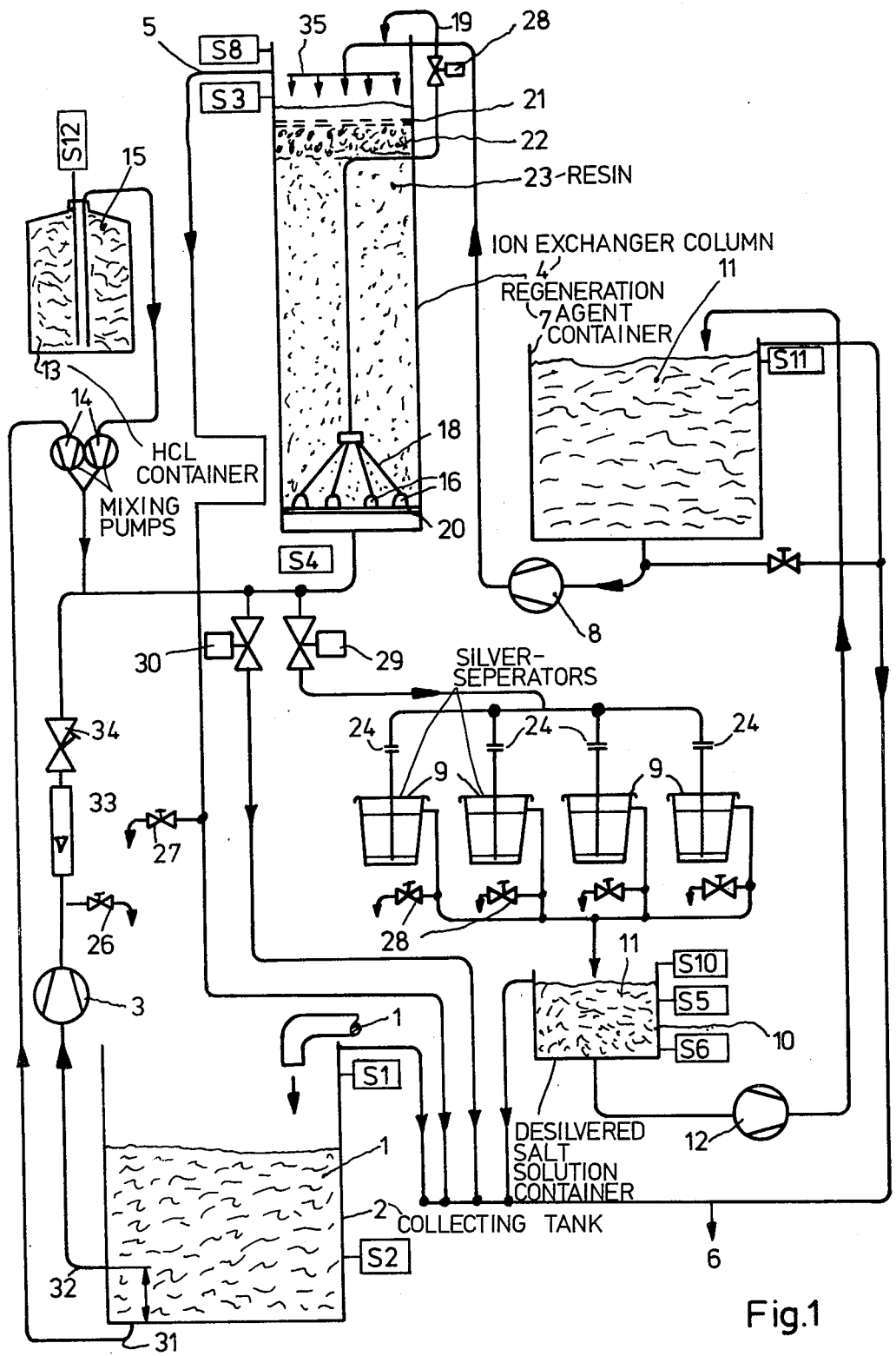
FIG. 1 is a schematic drawing or functional diagram of the apparatus.

FIG. 1 is a schematic representation of an embodiment, by way of example, of an apparatus with a throughput of 50 l/min of wash water 1, in which photographic films or papers were washed in a developing installation. The wash water 1 has a silver content of from 5 to 150 mg/l which was carried into the washing baths, by the photographic material to be washed, from the fixing bath or bleach fixing bath connected upstream.

The wash water 1 charged with silver is supplied from above to a collecting tank 2 from the developing device or devices. The collecting tank 2 has a lower outlet 31 which allows the tank 2 to be completely emptied and has an upper outlet 32 which is arranged such that approximately 70 l of wash water 1 remain in the tank 2 for flow cycle III which is described below.

The argentiferous wash water 1 is supplied to the ion exchanger column 4 from below via pipelines or tubelines from the collecting tank 2 by a pump 3. A quantity measuring device 33, for determining the quantity of the wash water 1 removed from the collecting tank 2, a control valve 34 for controlling this quantity, and a removal stopcock 26 for controlling the silver content may be installed in the line between the pump 3 and the ion exchanger column 4. The argentiferous wash water 1 flows upwards through the ion exchanger column 4 from below, whereby the silver complex contained in the wash water 1 is absorbed by the resin 23. For this purpose, the ion exchanger column 4 is filled with approximately 175 l of resin which is obtainable on the market under various names, e.g. a strongly basic anion exchanger from the group of products Lewatite ® made by Bayer, Amberlite ® made by Rohm and Haas or Duolite ® made by Diamond Shamrock. In order to prevent the resin 23 from being drawn out, the ion exchanger column 4 is sealed off at the top by a coarse filter or by a filter cloth 21 and a layer of floating granulated material 22 is introduced thereunder. This material 22 allows the wash water 1 to flow through easily, while it is impermeable to the resin 23. The desilvered wash water 1 runs out through an overflow 5 to a discharge outlet 6 and into a channel. The magnetic valves 28, 29 and 30 are closed during this operational cycle.

The ion exchanger resin 23 may absorb approximately 10 g of silver per liter during use. With the specified charge of the ion exchanger column 4 of, for example, 175 l of resin 23, it is possible to obtain a separation of 1750 g of silver. Depending on a silver content of the wash water 1 of from 5 to 150 mg/l, 350,000 to 12,250 l of wash water may be desilvered before the resin 23 has to be regenerated. With the assumed throughput of 50 l/min, this corresponds to a time of approximately 117 hours with the small silver content of 5 mg/l and to a time of approximately 4 hours with the very high silver content of 150 mg/l of wash water 1.

In practice, the developing installations operate with a relatively constant silver content in the wash water, so that after a determination of the silver content by removing wash water at the removal valve 26, the time after which the resin 23 must be regenerated may be calculated. After the calculated time has been fed into a time switch element, which may be timed for one week, a regeneration process is carried out automatically after this time has elapsed.

Regeneration is carried out in a second flow cycle and may be effected, for example, during the night.

The forwarding pump 3 for the wash water is turned off and the ion exchanger column 4 is emptied into the discharge outlet 6 by opening the magnetic valve 30. When the level control S4 is reached, the magnetic valve 30 is closed and magnetic valve 28 is opened.

Figure 2:
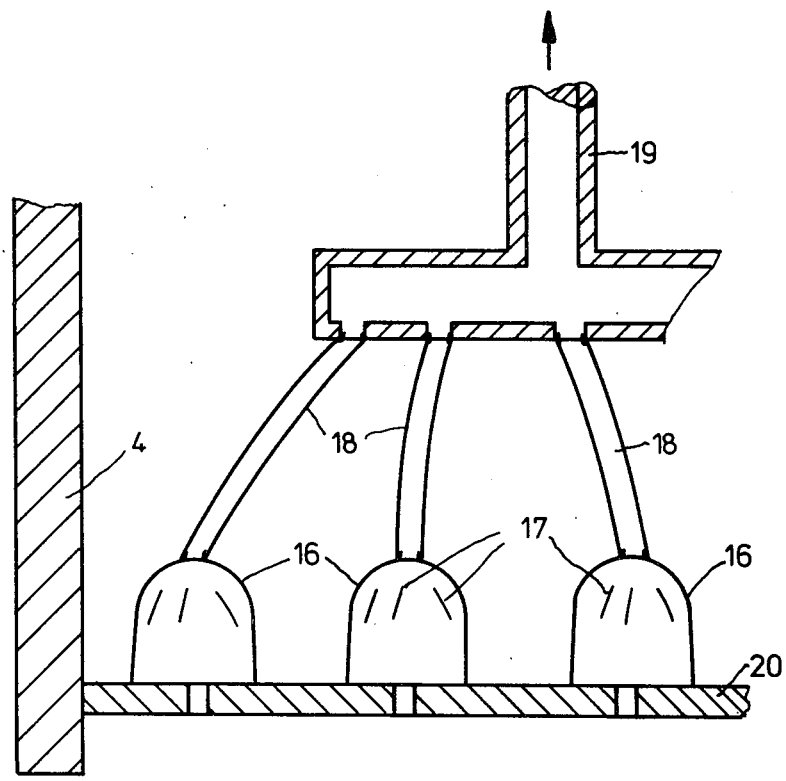
FIG. 2 is an enlarged view of part of the deaerator of the ion exchanger column.

An approximately 25% common salt solution 11 as the regeneration agent is introduced from above into the ion exchanger column 4 by a pump 8 via a trickling device 35 in the counterflow direction to the wash water flow from a regeneration agent container 7, and this flows through the resin 23 and absorbs the silver deposited therein. The air in the ion exchanger column 4 is pressed downwards by the salt solution 11 and it flows into the narrow slits 17 of the hemispherical bodies 16 (FIG. 2) located on a lower base 20. The air is collected in the hemispherical bodies 16, is converged through lines 18 and is guided through a pipe 19 by a magnetic valve 28. While the air escapes, liquid which has been entrained flows back into the ion exchanger column 4. Due to the design of the thin slits 17 in the hemispherical bodies 16, the resin 23 does not penetrate them. The salt solution flows downwards through the slits.

As soon as the ion exchanger column 4 has been filled with salt solution and the level switch S3 responds, the magnetic valve 29 is opened and the salt solution 11 charged with silver leaves the ion exchanger column from below and flows through the magnetic valve 29 and via screens 24 into bucket-shaped iron wool shells 9.

The silver from the salt solution 11 is deposited on the iron wool and the desilvered salt solution 11 leaves the iron wool shells 9 and is collected in a container 10.

The salt solution 11 is pumped back into the regeneration agent container 7 from the container 10 by a pump 12. The pump 12 is switched on when the level indicator S5 responds and it is switched off when the salt solution 11 reaches the level indicator S6. Another level indicator S10 releases an alarm when the upper level is exceeded.

The regeneration of the resin 23 by the regeneration agent, for example a common salt solution, lasts for approximately four hours, whereby the salt solution supply is controlled by the switching on and off of the pump 8 by the level switch S3. The throughflow rate, and thus the quantity of the salt solution, is controlled by screens 24 upstream of the iron wool shells and is approximately 1.25 l/min per screen, and therefore 5 l/min with four screens. Though the salt solution 11 is returned to the regeneration agent container 7, the concentration thereof decreases and therefore common salt must be re-added from time to time to the container 7.

When the resin 23 has been regenerated, a pulse from the programme time switch clock causes the switch element to switch over again to the first flow cycle. The pump 8 for moving the salt solution 11 is turned off and the salt solution leaves the ion exchanger column 4. When the level recorder S4 determines that the ion exchanger column is empty, the magnetic valve 29 is closed. When the pump 3 has been switched on, the flow cycle I for desilvering the wash water 1 recommences.

After a number of desilvering operations of the wash water 1 (flow cycle 1) and regeneration operations of the resin 23 (flow cycle II), the ion exchanger column 4 and the resin 23 have to be purified. This is carried out approximately once every two weeks, mostly at the weekend, after the resin 23 has been regenerated. A standard 30% hydrochloric acid 15, or some other acid, e.g. citric acid, in a corresponding concentration, is used for the purification operation.

The hydrochloric acid 15 is automatically drawn by suction to a mixing pump 14, e.g. a double bellows pump, via a suction pump with a level sensor S12 from the container 13 and is diluted to a concentration of 10% with the wash water, which is also removed by suction by the double bellows pump 14 from the collecting tank 2, and is pumped into the ion exchanger column 4 from below.

The ion exchanger column is filled with the dilute hydrochloric acid 15 until the level switch S3 responds or the level switch S12 indicates that the hydrochloric acid 15 has been used up. The collecting tank 2 is provided with two outlets 31 and 32 so that a sufficient quantity of wash water 1, for example 70 l, is available for diluting the hydrochloric acid 15. The outlet 32 is positioned at a suitable height (see the arrow) for desilvering the wash water and is controlled by the level sensor S2. The wash water 1 is removed from the lower outlet 31 for diluting the acid.

For purification, the dilute hydrochloric acid 15 acts on the resin for a time of, for example, twelve hours and purifies the resin during this process. After the purification time, the process is automatically switched over directly to the flow cycle I and wash water I is pumped from below into the ion exchanger column 4 by the pump 3. As a result of this, the hydrochloric acid 15 is re-diluted and is pumped into the discharge 6 via the overflow 5. The purification step is complete and the wash water 1 is again passed through the resin 23 for the desilvering operation.

Control stopcocks 26 to 28 to remove samples are provided for controlling the functions and the supervision of the apparatus. A sample may be removed at stopcock 26, from which the silver content of the wash water may be determined. It may be deduced from this sample after which periods of time a regeneration operation must take place. Stopcock 27 is used for removing samples which indicate the performance of the resin 23. The samples should not contain any silver. If a silver concentration of more than 1 mg/l is determined, the regeneration time intervals should be shortened. Finally, removal stopcocks 28 are located downstream of the iron wool shells 9, from which samples may be removed to determine when the iron wool shells 9 are worn out and have to be replaced by new shells. If electrolysis devices (not shown) are used for separating the silver from the salt solution instead of the iron wool shells 9, then the removal stopcock 28 is located at the salt solution outlet from the electrolysis device, though it has the same function.

The individual containers 2, 4, 7 and 10 are provided with overflow pipes which are connected to the discharge outlet 6. An alarm is given simultaneously by level sensors S1, S8, S10 and S11 before overflowing occurs, and the apparatus is stopped if the error is not corrected.

The exhausted iron wool shells 9 may be passed on to a separating installation for processing and silver recovery. When the apparatus is fully charged, it suffices to change the resin 23 once or twice per year. The resin 23 used still contains silver (approximately 1 kg) so that it may be advantageous to recover it in a separating installation.

If the apparatus is switched on using a master switch and if the switch element is programmed, then all the functions take place automatically and are represented on a flow chart. When disturbances occur, corresponding indicators with light emitting diodes and an acoustic signal, which may be cancelled manually, appear on the flow chart. However, the optical disturbance indicator remains until the error has been corrected. Where there is danger of liquids overflowing, the apparatus is automatically switched off.

After a power failure, an emergency alarm or disconnection by the master switch, the installation automatically resumes its former operational condition when the voltage returns or when the cause of the alarm disappears, except when the week switch element has switched over in the meantime to another operational condition. The operational condition of the moment is stored for an unlimited time and the week switch element has a power reserve of 100 hours.

The apparatus has been described by way of example with reference to an embodiment using a volume of wash water of 50 l/min. This apparatus is also suitable for smaller quantities of wash water due to its construction and operational methods. It may also be designed for larger quantities of wash water without exceeding the scope of the invention.

We claim:
1. In apparatus for the automatic recovery of silver from wash water containing silver, comprising
an ion exchange column filled with resin for absorbing contained silver and provided with means for guiding a regeneration liquid around the resin to desilver the resin in counterflow without loss of resin,
a silver separator,
a multiple time switch clock,
a collecting tank adapted to receive wash water containing silver
a first pump adapted to transport the wash water and silver from the tank to the column and to the resin,
a first means for controlling the flow of the wash water and silver from the tank to the column,
whereby the silver is deposited in the column
a discharge outlet
an overflow means adapted to transport the wash water from the column to the discharge outlet;
an agent container,
means in said separator for separating the silver from the water,
a second pump being adapted to move a regeneration agent from the agent container to said column, a second means for guiding the flow of the regeneration agent from the container to the column and to the resin, and for controlling the flow of the regeneration agent from the column to the silver separator a reservoir for collecting the desilivered agent a third pump being adapted to move the agent from the reservoir to the agent container an acid container at least two mixing pumps adapted to mix an acid with wash water from said collecting tank, a third means for guiding the flow of the mixture of acid and wash water to the column, means controlled by said clock for selectively switching said first, second and third means adapted to selectively guide and control the flow.

2. An apparatus according to claim 1, characterised in that in the means for guiding the regeneration liquid the ion exchanger column is provided in the base part with a plurality of hemispherical heads on a base for deaeration during regeneration and the heads are provided with narrow slits, and air removal tubes or pipes are located in the upper region of the heads and are brought together and connected to an air removal line which is guided over the ion exchanger column.

3. An apparatus according to claim 1, characterised in that the ion exchanger column is provided at the top with a sieve and a coarse-grained granulated material is introduced below the sieve, the granulated material being specifically lighter than the wash water.

4. An apparatus according to claim 1, characterised in that the containers and the ion exchanger column are provided with level sensors for automatic control and supervision and switching of the flow cycles with magnetic valves.

* * * * *